United States Patent [19]

Palm et al.

[11] 3,955,590

[45] May 11, 1976

[54] REGULATOR FOR VEHICLE LEVELING SYSTEMS

[75] Inventors: Walter C. Palm, Grand Rapids, Mich.; James Lyon, Perrysburg, Ohio

[73] Assignee: Midland-Ross Corporation, Cleveland, Ohio

[22] Filed: Nov. 5, 1974

[21] Appl. No.: 521,053

[52] U.S. Cl. .................. 137/116.5; 137/505.35; 137/505.42
[51] Int. Cl.² ........................................ G05D 16/10
[58] Field of Search....... 137/116.5, 505.34, 505.35, 137/505.42, 627.5; 280/124 F

[56] References Cited
UNITED STATES PATENTS

| | | | |
|---|---|---|---|
| 763,162 | 6/1904 | Curran | 137/505.42 |
| 3,064,670 | 11/1962 | Peras | 137/116.5 |
| 3,145,032 | 8/1964 | Turek | 137/627.5 X |

*Primary Examiner*—Robert G. Nilson
*Attorney, Agent, or Firm*—Woodrow W. Portz

[57] ABSTRACT

A fluid pressure regulator adapted to receive a supply of fluid through a check valve system thereof which prevents admission of fluid above a preselected operating pressure, and discharge of fluid from an apparatus served thereby below, a fail-safe pressure upon complete failure of the pressure supply source.

4 Claims, 11 Drawing Figures

3,955,590

REGULATOR FOR VEHICLE LEVELING SYSTEMS

BACKGROUND OF THE INVENTION

The regulator herein disclosed has special utility as a controller for air pressure and pneumatic suspension devices, such as air spring and pneumatic-hydraulic shock absorbers for highway vehicles. Regulators for this purpose currently in commercial use lack such features as (1) mechanism for maintaining minimum pressures in these devices when the air source fails; (2) adjustable valve structure for preselecting different minimum fail-safe pressures; and (3) adjustable indicia structure for indicating a desired pressure to which the suspension system can be returned after temporary departure from corresponding operating conditions of the vehicle. In their normal use, such regulators are mounted on or adjacent to the dash of a vehicle or in other proximity to an operator station.

SUMMARY OF THE INVENTION

In general, a regulator of this invention has a housing forming a continuous elongate passageway therethrough defining an inlet port at one end and a control means receiving region at the other end. The passageway further forms a valve chamber adjacently inward of the inlet port and a cylindrical piston chamber adjacently inward of the control means receiving region. These chambers are spaced and connected by an intermediate bore of lesser diameter than that of either chamber. The housing further provides an exchange port in communication with the bore adapting the housing to be connected with one or more pneumatic devices needing air at a desired pressure, such as pneumatic vehicle suspension devices. The regulator further comprises check valve elements received in the opposite ends of the valve chamber and resilient means which may consist of a single spring engaging both check valve elements to urge them against respective seats provided by the housing.

A valve body is received in the piston chamber and comprises a piston in circumferential sealed slidable relation with the cylindrical surface of the chamber. The body further comprises a tube in coaxial relation with the piston projecting through the intermediate bore at a fluid-conducting radial clearance therewith with its distal end normally seating on the face of the check valve element normally sealing one end of the bore to close off any escape of fluid through the body and the housing at neutral closed condition of the regulator.

A second resilient means, such as a coil spring, is received in the control means receiving region with its inward end seated on the piston for urging the body into engagement with the second check valve element. The regulator further includes control structure connected with the housing, e.g., in threaded relationship, which engages the second named resilient means and may be manipulated to various states of compression to vary the force with which the tube of the body bears on the second check valve element. The regulator is constructed for free movement of the fluid transmitted thereby away from the outward end of the piston through the control means receiving region.

In the preferred embodiment, the outer end of the resilient means bearing on the body is received in a socket in exteriorly threaded relation with a bushing which extends axially in telescopic adjustable relation with the housing. Radially inward extending shoulder structures may be provided at each end of the bushing for limiting axial movement of the socket within the bushing whereby axial adjustment of the bushing relative to the housing has the effect of changing the maximum outward and inward locations of the socket relative to the housing to effect corresponding maximum and minimum pressure settings for regulator operation.

Figure 1:
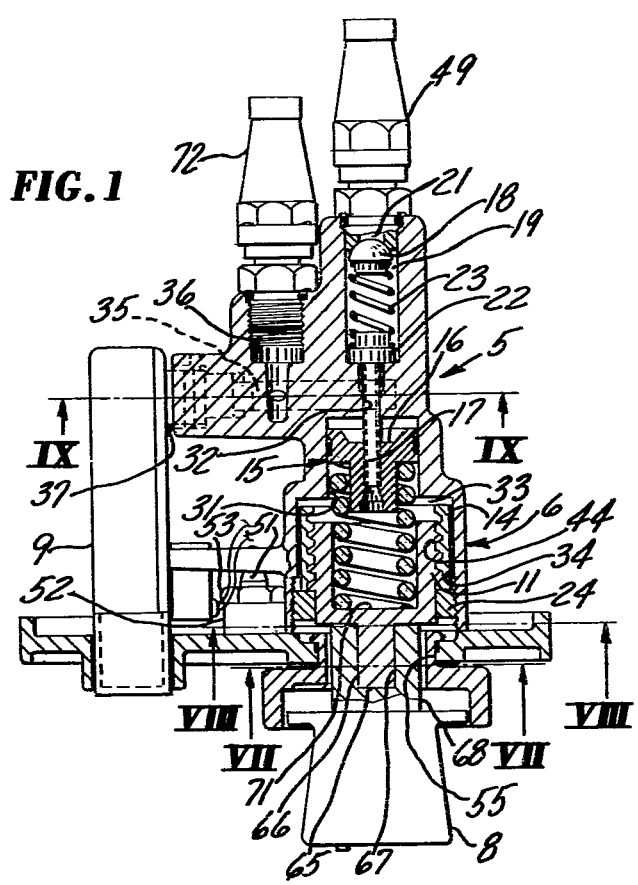
FIG. 1 is a view of a regulator according to the invention with parts shown in longitudinal section along an axis of an elongate passageway extending lentghwise of the regulator when the regulator is in a neutral closed condition with both check valves closed.

Considering now the pressure regulator 5 of this invention in reference to the drawing, the regulator comprises as principle parts, a housing 6, a bezel 7, a control knob 8, a pressure indicating instrument 9, a spring seat socket 11, a control spring 12, a bushing 14 in threaded relation with the socket and non-rotatable relation with the housing, a pressure responsive body 15 comprising a piston 16 and a tube 17 fixed to the piston, a check valve element 18 seated in the end of a valve chamber 19 over the inner end of an inlet port 21 of the housing, a check valve element 22 seated over the end of the chamber 19 further away from the inlet port 21, a spring 23 positioned between, and engaging, valve elements 18, 22 in a state of compression, a threaded retainer ring 24 in threaded relation with an internal surface of the housing 6 for positioning the bushing 14, and an annular memory knob 25 in frictional rotatable relation with the bezel and surrounding coaxial relation with the knob 8.

Figure 9:
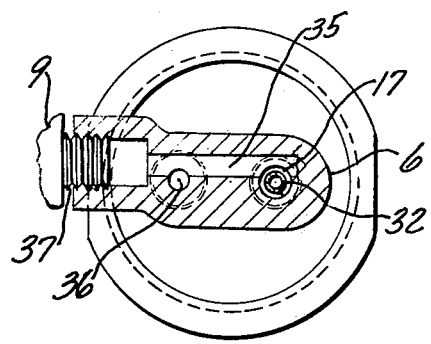
FIG. 9 is a transaxial view in cross section taken along line IX—IX of FIG. 1.
Figure 10:
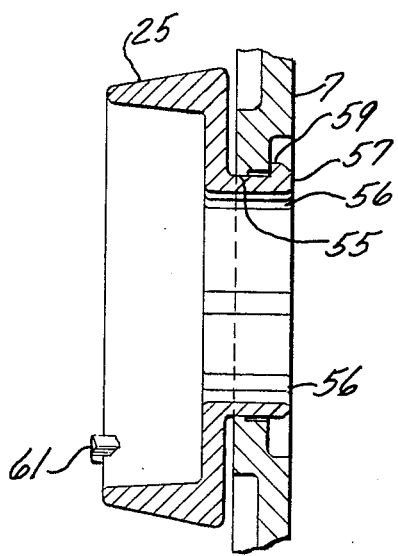
FIGS. 10 and 11 are diametric cross sectional and underside views, respectively, of an annular memory knob encircling a control knob of the regulator of the foregoing figures.

The housing 6 forms and defines a continuous elongate passageway therethrough which comprises the above-mentioned valve chamber 19 and the inlet port 21, a piston chamber 31, an intermediate bore 32 which connects the valve chamber 19 and the piston chamber 31 and extends in coaxial relation with both chambers, and a control means receiving region 33 defined in part by the generally cylindrical internal surface 34 of the housing. The casing 6 also has an exchange port 35 (see also FIG. 9) which extends transversely through the housing in intersecting relation with the bore 32 and the outlet portion 36 of the exchange port. The exchange port is also contiguous with the pressure indicating instrument 9 by threaded relationship of the housing with a duct portion 37 of the instrument as shown in FIG. 9. The exchange port, depending on the position of the check valve elements and the body 15 communicates through the bore 32 at all times with the nearer end of the piston chamber 31 and valve chamber 23 when check valve element 22 is unseated. The bore 32 forms a clearance with the tube 17 as shown in FIG. 9.

Figure 6:
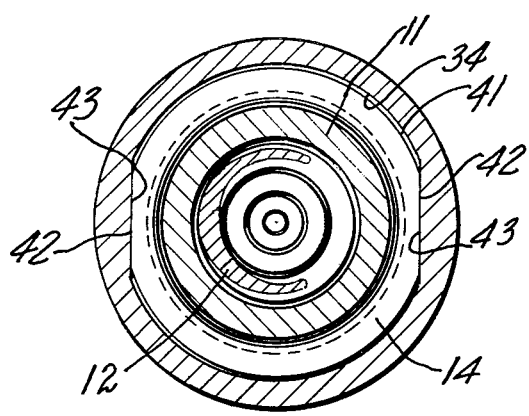
FIG. 6 is a transaxial view in cross section taken along line VI—VI of FIG. 1.
Figure 7:
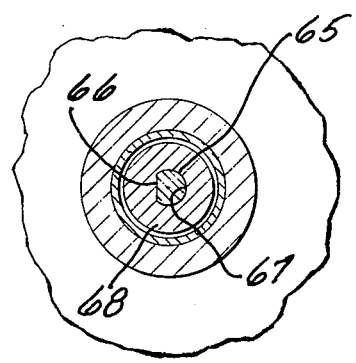
FIG. 7 is a transaxial view in cross section taken along line VII—VII of FIG. 1.
Figure 8:
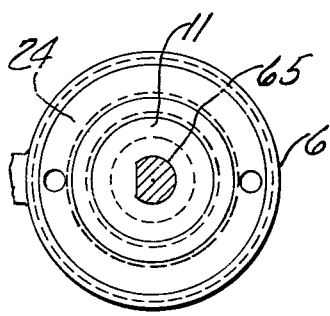
FIG. 8 is a transaxial view in cross section taken along line VIII—VIII of FIG. 1.

Noting now the control apparatus received with the control region, it may be noted from FIG. 6 that the internal smooth surface 34 of the housing and the external surface 41 of the bushing 14 are generally cylindrical except for complimentary longitudinally extending flat surfaces 42, 43 of the bushing and the housing, respectively. These flat surfaces may occur in two sets 180° apart as shown or in any other desired pattern to render the bushing and the casing relatively non-rotatable.

As FIGS. 1, 4, 5 and 6 show, the socket 11 has an external thread received by an internally threaded area 44 of the bushing. The threaded area 44 terminates in a radially inwardly extending shoulder 45 in the end of the bushing facing toward the inlet (see FIG. 4). As shoulder 45 is non-helical, rotation of the socket 11 against this shoulder is terminated. At its outer end, the bushing 11 is engaged by the retainer ring 24. The inner diameter of the retainer ring is small enough to provide radial overlapping with a portion of the socket 11. As shown, the ring 24 extends radially inwardly to radially overlap with the external threads of the socket 11. Thus, the ring 24 forms an entrapping shoulder for the socket and together with the shoulder 45 defines a range of adjustment therebetween. The ring itself is adjustable relative to an internally threaded surface 47 of the housing to shift the bushing 14 relative to the housing in its longitudinal direction.

With the internal items of the regulator secured within the housing by the ring 24 and an inlet fitting 49, the bezel 7 may be attached to the housing by means such as a stud 51 fixed to the bezel extending through an eye portion 52 of the housing unit nut 53 turned into place on the stud.

Figure 2:
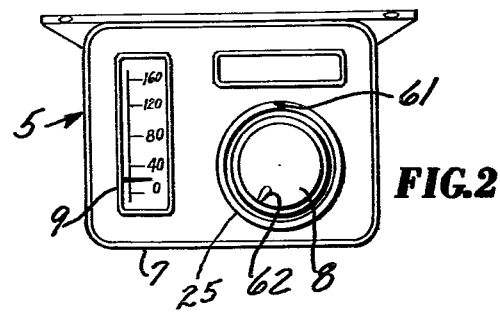
FIG. 2 is a front face view of the regulator of FIG. 1.
Figure 3:
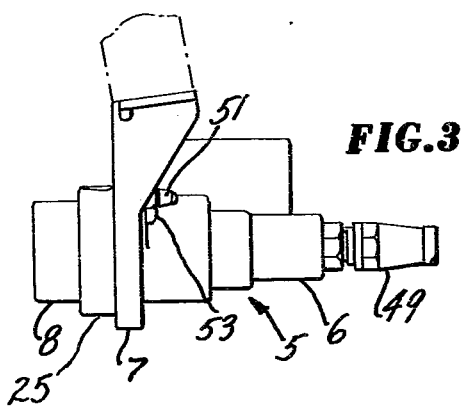
FIG. 3 is a side view of the regulator of FIGS. 1 and 2.
Figure 11:
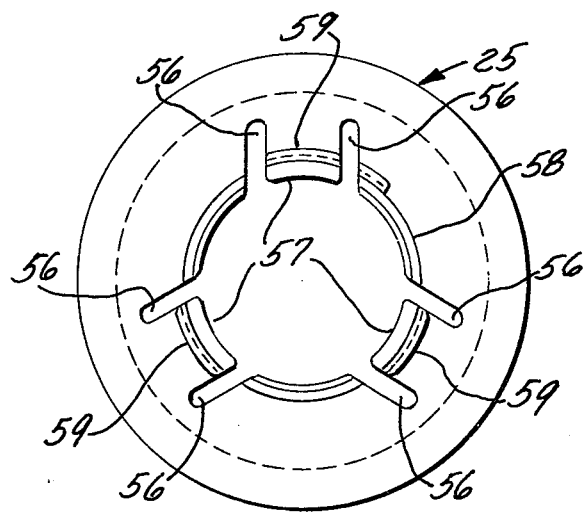

The bezel 7 is prepared for attachment to the housing 6 by first inserting the hub portion of the memory knob 25 through an opening 55 of the bezel. It will be noted in FIG. 11 that the memory knob 25 has slots 56 which allow tongues 57 to spring radially inwardly as the hub portion of the ring is forced through the opening 55. The diameter 58 of the other hub portions is approximately that of the opening 55 or a little less. However, the tongues 57 have radially extending shoulders 59 which necessitate the tongues to spring inwardly as the hub portion is inserted. Once in place, the hub of the memory ring 25 establishes frictional contact with the periphery of the opening 55 and will maintain a fixed position relative to the bezel until its frictional contact therewith is overcome by manaual effort. The memory ring is provided with an index boss 61 which may be matched with an index mark or protrusion 62 on the knob 8 (see FIG. 2).

With the housing and memory now attached to the bezel as described above, assembly is completed by pressing the knob 8 into place by causing a stub shaft 65 having a chordal flat area 66 to enter cylindrical cavity 67 having a complimentary flat area in the hub portion 68 of the knob. With the knob in place, the regulator may now be controlled by the turning of the knob to change the axial position of the socket 11 relative to the bushing 14 to increase or decrease the state of compression of the spring 13 confined between a shoulder surface of the piston 16 and a socket surface 71.

Figure 4:
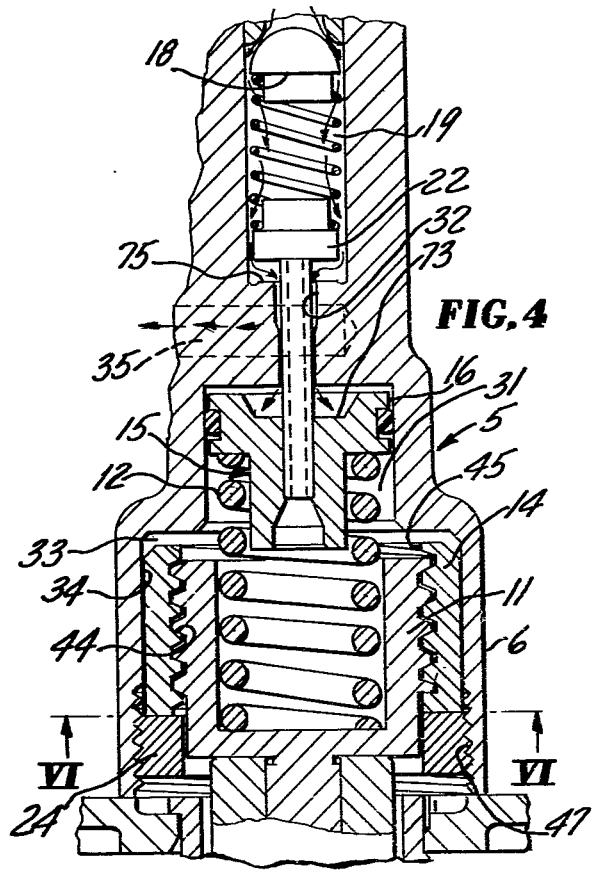
FIG. 4 and 5 are fragmentary section views of the regulator of FIGS. 1 to 3 indicating (1) in FIG. 4, check valves positioned for passing a fluid from the inlet port outwardly through the exchange port of the regulator, and (2), in FIG. 5, both check valves closed but the piston-tube body thereof positioned to receive fluid from the exchange port and discharge it outwardly of the regulator.

Assuming the inlet fitting 49 to be connected to a high pressure air source and the exchange port fitting 72 to be connected to devices to be maintained at a desired pressure setting of the regulator, the regulator will be responsive to any pressure existing in the airusing devices, i.e., the line pressure within the exchange port 35 contiguous with fitting 72. For example, when the pressure through fitting 72 drops below the desired control pressure or the control pressure setting of the regulator is raised, piston 16, exposed by its surface 73 to any pressure in the exchange port 35 at all times with the pressure, moves toward the valve chamber 19 to achieve a new balance between the reduced pressure on area 73 and the spring 12 which now extends itself to a length in which it exerts a weaker static force on the piston. During this readjustment, the tube 17 of the body 15 unseals the valve element 22. This is accompanied by unseating of the element 18 air to pass from the fitting 49 through the regulator and through the exchange port 35 as shown in FIG. 4. As the pressure builds up within a device served by the regulator, pressure against piston surface 73 is increased until the piston has traversed sufficient reverse movement in a direction compressing the spring 12 to cause the element 22 to seat on its seat 75. During admission of the air through the regulator, the element 18 has become unseated from its seat over the inlet port.

Figure 5:
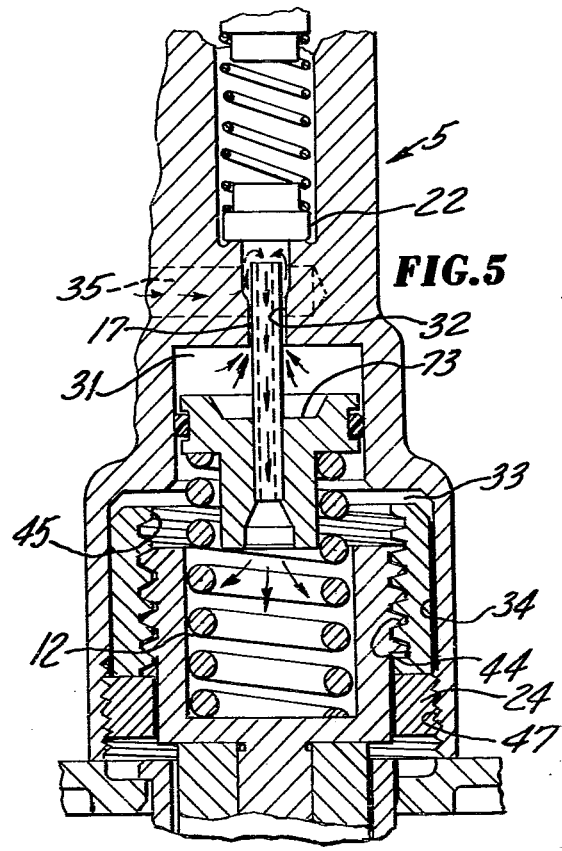

FIG. 5 illustrates the withdrawal of air from penumatic devices served by a regulator on the occasion, e.g., when the knob 8 is turned in a direction to decompress the spring 12, i.e., to increase its length and thus reduce force it exerts on the piston 16. Assuming, for example, that the rear end of a vehicle is riding too high and the knob 8 is then turned to weaken the compressive force of the spring 12, the existing pressure in the pneumatic suspension devices communicated through exchange port 35 and the intermediate bore 32 causes a new equilibrium position of the body 15 to be sought by the spring 13 and the pressure acting on piston surface 73. In this instance, as the body 15 moves further inwardly of the socket 11 toward the knob 8, the end of the tube 17 disengages from the seated element 22 and exposes the end of the tube to the air escaping under pressure through the bore 32 from the pneumatic devices. Air then escapes outwardly through the tube in the direction of the knob and through the loose air-pervious construction of the bushing and the socket to the atmosphere. Escape of air and new equilibria between the spring 13 and the air pressure in the exchange port continue until the body 15 is again positioned with the end of the tube 17 resting against the valve element 22. The end of the tube is thereby sealed with valve elements 18, 22 seated to establish the static neutral condition of the regulator.

What is claimed is:

1. A fluid pressure regulator comprising:
   a housing having a continuous elongate passageway defining an inlet port at one end and a control means receiving region at the other end, said passageway having a valve chamber adjacent to the inlet port, and a cylindrical piston chamber adjacent to said region, said chambers spaced and connected by an intermediate bore of lesser diameter than that of said chambers;

said housing having an exchange port in communication with said bore;

a first check valve means having a seat in the end of the valve chamber nearer said inlet port operable to admit fluid into the valve chamber;

a second check valve means having a seat in the end of the valve chamber further from said inlet port;

resilient means urging both check valve means to closed condition;

a valve body comprising a piston in circumferentially sealed slidable relation with said piston chamber, and a tube fixed coaxially to said piston and projecting through said bore at clearance therewith with its distal end seating on said second check valve means to effect sealed closure of said distal end at closed condition of the regulator;

said tube and piston defining an axial opening through said body;

a compression spring seated on a surface of said valve body facing away from said bore;

an externally threaded spring-seat socket fitting over the end of said spring further from said body;

a bushing having an internally threaded area surrounding said socket in threaded relation therewith with the outer surface of the bushing received in close-fitting relation with a lateral internal housing surface defining said region;

radially inwardly extending shoulder means located at at least one end of said internally threaded area limiting axial movement of the socket relative to the bushing;

means for adjusting the bushing to selected positions lengthwise of said passageway;

means for securing said bushing from rotation relative to said housing;

means for rotating said socket within said bushing to vary the length and compression of said spring.

2. The regulator of claim 1 wherein:

said housing has, as internal surfaces forming said region, an internally threaded surface adjacent to the end of the housing and a generally cylindrical bushing-receiving surface extending inwardly from said threaded surface, said bushing receiving surface being less in diameter than the threaded area and comprising at least one flat chordal surface extending at least a portion of the length of the bushing receiving surface;

said bushing having an outer surface generally complimentary to said bushing receiving surface adapting it for axial movement relative to the housing;

a retainer ring providing said shoulder means and having external threads in threaded relationship with the internal threads of said area, and an inwardly facing end surface in overlapping engaged relation with the end surface of said bushing, said ring adjustable along said threaded area to effect changes in the axial position of said bushing.

3. The regulator of claim 2 wherein:

said inward end surface of said ring overlaps in a radial inward direction a portion of said socket to form a shoulder limiting outward axial movement of said socket.

4. The regulator of claim 1 wherein:

said socket has a coaxial stub shaft extending coaxially outwardly from its closed end;

a control knob having a coaxial recess substantially complementary to said external surface of said stub shaft; and means for securing the knob and the stub shaft from relative rotation;

a bezel extending in a plane generally perpendicular to the axis of said passageway;

means for securing said bezel to the end of the housing adjacent to said region, said bezel having an opening in generally coaxial relation with the axis of the passageway;

an annular memory knob having a central opening accommodating a portion of said knob attachable to said stub shaft; said memory ring having a portion insertable through said opening of said bezel in frictional-rotatable relationship with the portion of the bezel surrounding said opening;

said memory knob and said control knob having indicia thereon for indicating angular positions of each relative to the other; said memory knob being rotatable under frictionally restrained movement to any desired angular position relative to said bezel.

* * * * *